(12) United States Patent
Cheng et al.

(10) Patent No.: US 8,878,898 B2
(45) Date of Patent: Nov. 4, 2014

(54) SMART 3D HDMI VIDEO SPLITTER

(75) Inventors: Chuan-Hung Cheng, Tauyuan (CN); Chin-Shih Chang, Tauyuan (CN); Shu-Cheng Liu, Tauyuan (CN)

(73) Assignee: DA2 Technologies Corporation, Xizhi, Taipei County (TW)

( * ) Notice: Subject to any disclaimer, the term of this patent is extended or adjusted under 35 U.S.C. 154(b) by 321 days.

(21) Appl. No.: 13/615,761

(22) Filed: Sep. 14, 2012

(65) Prior Publication Data

US 2013/0182068 A1 Jul. 18, 2013

(30) Foreign Application Priority Data

Jan. 17, 2012 (TW) ................................. 101101665

(51) Int. Cl.
*H04N 13/00* (2006.01)
(52) U.S. Cl.
CPC ................ *H04N 13/0055* (2013.01)
USPC .......................................................... 348/43
(58) Field of Classification Search
CPC ................................................ H04N 13/0055
USPC .......................................................... 348/43

See application file for complete search history.

(56) References Cited

U.S. PATENT DOCUMENTS

| | | | |
|---|---|---|---|
| 2004/0189870 A1* | 9/2004 | Champion et al. | 348/510 |
| 2006/0209957 A1* | 9/2006 | Riemens et al. | 375/240.16 |
| 2011/0032331 A1* | 2/2011 | Chen et al. | 348/43 |
| 2011/0149032 A1* | 6/2011 | Choi et al. | 348/43 |
| 2011/0187818 A1* | 8/2011 | Hasegawa et al. | 348/42 |
| 2012/0105583 A1* | 5/2012 | Suh et al. | 348/43 |
| 2012/0113099 A1* | 5/2012 | Kim et al. | 345/419 |
| 2012/0154374 A1* | 6/2012 | Cheng et al. | 345/419 |
| 2014/0225986 A1* | 8/2014 | Nagase et al. | 348/43 |

* cited by examiner

*Primary Examiner* — Sath V Perungavoor
*Assistant Examiner* — James Pontius
(74) *Attorney, Agent, or Firm* — Bacon & Thomas, PLLC

(57) ABSTRACT

A smart 3D HDMI video splitter is disclosed. When a 3D video signal enters the smart splitter, a field-programmable gate array converts the 3D signal so that the smart 3D HDMI video splitter outputs a 3D or 2D signal according to the type of the television, display or AVR amplifier.

3 Claims, 23 Drawing Sheets

Fig. 5

Situation 1: fcount=1, odd line

Situation 2: fcount=1, even line

Situation 3: fcount=2, odd line

Situation 4: fcount=2, even line

Situation 5: fcount=3, odd line

Situation 6: fcount=3, even line

Situation 7: fcount=4, odd line

Situation 8: fcount=4, even line

Situation 1: fcount=1, odd line

Situation 2: fcount=1, even line

Situation 3: fcount=2, odd line

Situation 4: fcount=2, even line

Situation 5: fcount=3, odd line

Situation 6: fcount=3, even line

Situation 7: fcount=4, odd line

Situation 8: fcount=4, even line

Situation 3: fcount=2, odd line

Situation 4: fcount=2, even line

Situation 5: fcount=3, odd line

Situation 6: fcount=3, even line

Situation 7: fcount=4, odd line

Situation 8: fcount=4, even line

Situation 3: fcount=2, odd line

Situation 4: fcount=2, even line

Situation 5: fcount=3, odd line

Situation 6: fcount=3, even line

SMART 3D HDMI VIDEO SPLITTER

BACKGROUND OF THE INVENTION

1. Field of Invention

The invention relates to a video splitter and, in particular, to a smart 3D HDMI video splitter.

2. Related Art

ROC Pat. No. 095208526 discloses an HDMI splitter, which includes a microprocessing unit with a controlling program by default, an HDMI receiving unit, and a plurality of HDMI transmitting units. The input terminals of the HDMI transmitting units are connected to the HDMI receiving unit and the microprocessing unit. Their output terminals are connected to televisions or displays. The HDMI receiving unit receives an HDMI signal and deciphers it into a normal digital AV signal. The controlling program of the microprocessing unit then controls different transmitting units to encrypt the signal independently. It further delivers encryption keys for different televisions and displays for them to decrypt the corresponding signals. This achieves the goal of driving multiple televisions and displays using one set of HDMI signals.

The above-mentioned traditional HDMI splitter inputs one set of HDMI signals to a splitter. The controlling unit of the splitter outputs the signals to the HDMI connectors at each output terminals. However, the traditional HDMI splitter can only output either 2D or 3D video signals to the output terminals at a time. When the source signal is a 3D video and the user selects the 3D output, then the 2D television or display cannot display the signals. On the other hand, if the user selects the 2D output, then the 3D television or display cannot show the 3D video. This is a great inconvenience for the users.

SUMMARY OF THE INVENTION

The invention provides a smart 3D HDMI video splitter. A 3D video signal enters via HDMI transmissions to a field-programmable gate array (FPGA) for conversion. A micro-controller detects the type of the connected television, display or AVR amplifier. The invention then outputs 2D or 3D signals according to the connected television, display or AVR amplifier. In particular, the FPGA further includes: an input video unit, a video format processing unit, a controlling unit, and a multiplexer unit.

Once a 3D video is input to the invention, the input video unit synchronizes and renormalizes the video signal according to the commands of the controlling unit.

The video format processing unit uses a conversion formula to convert the 3D video into the checkboard, field-sequential, line interlaced, or left-/right-eye single output, or left-eye/right-eye dual output format, using second-generation double-speed dynamic random access memory (DDRII). The video is output to the multiplexer unit and converted according to the format determined by the controlling unit.

The controlling unit sends command which separates the video signal into an odd-numbered-pixel image and an even-numbered-pixel image if the output video is of the checkboard, field-sequential or line interlaced format, and outputs an video format command to the video format processing unit. If the video is of the left-/right-eye single output or left-eye/right-eye dual output format, the controlling unit sends command which divides the video into a first-half-column-pixel image and a last-half-column-pixel image, and outputs an video format command to the video format processing unit.

The micro-controller detects whether a connected device is a 2D or 3D television, display, or AVR amplifier. The detection result is used for the multiplexer unit to determine whether the last output video is the original input 3D video format (3D frame-packing format, 3D side-by-side format, 3D top-and-bottom format, etc.) or a processed 3D video format (checkboard, field-sequential, line interlaced, left-/right-eye single output, or left-eye/right-eye dual output format).

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein:

FIG. 5 defines the frame-packing data according to the invention;

DETAILED DESCRIPTION OF THE INVENTION

The present invention will be apparent from the following detailed description, which proceeds with reference to the accompanying drawings, wherein the same references relate to the same elements.

Figure 1:
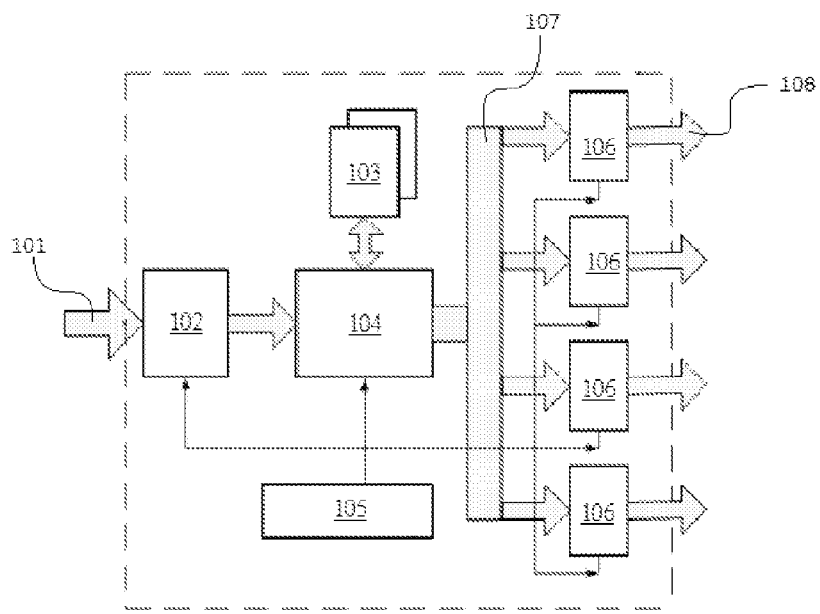
FIG. 1 is a block diagram of the disclosed splitter.

A smart 3D HDMI video splitter is shown in FIG. 1. A 3D video signal 101 is input via HDMI transmission and sent to an HDMI signal receiver 102 for an FPGA 104 to make a conversion. DDRII is used to store processing data. A micro-controller 105 determines a video format and detects the type of a television, display or AVR amplifier. The original 3D video signal or processed 3D image signal 107 is sent to an HDMI signal transmitter 106 for sending the video signal 108 to the corresponding television, display, or AVR amplifier. The output of the original 3D video signal or processed 3D video signal is determined by the micro-controller 105.

Figure 2:
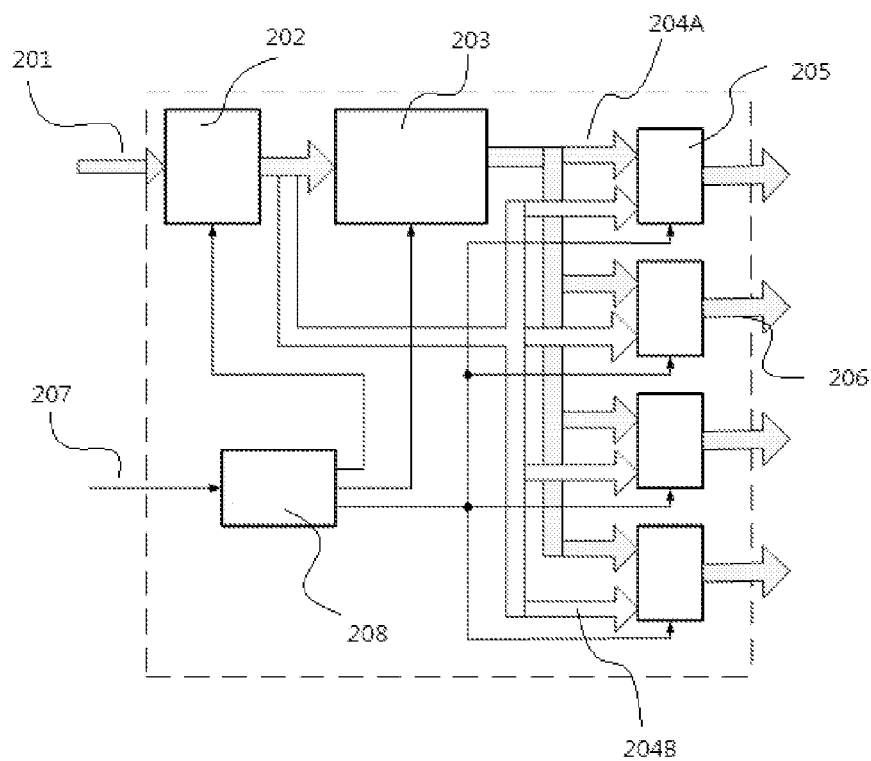
FIG. 2 is a block diagram of the disclosed FPGA.

As shown in FIG. 2, the FPGA 104 includes the following tasks. The video input signal 201 is sent to a video capturing unit 202 for video signal synchronization and renormalization. Afterwards, the video signal is output to a video format processing unit 203 and a video output multiplexer 205. The video format processing unit 203 converts the original 3D video signal format 204B (3D frame-packing format, 3D side-by-side format, 3D top-and-bottom format) into the processed 3D video format 204A (checkboard, field-sequential, line interlaced, left-/right-eye single output, or left-eye/right-eye dual output format). The converted video signal is determined by the controlling unit 208. Externally, the controlling unit 208 is notified of the conversion target via the I2C serial communication bus 207.

The video output signal 206 is output via the video output multiplexer 205. The controlling unit 208 determines whether to output the processed 3D video signal 204A or the original 3D video signal 204B.

Figure 3:
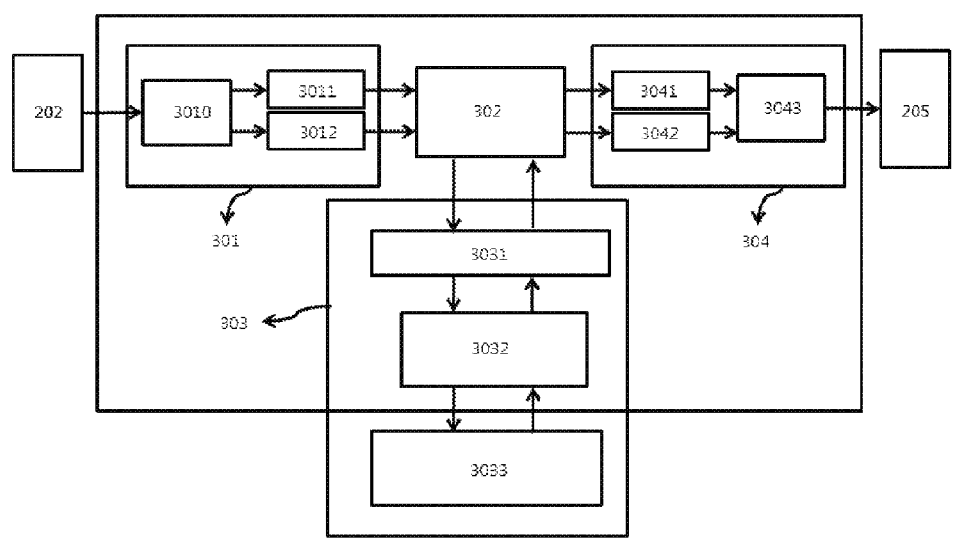
FIG. 3 is a block diagram of the disclosed video format processing unit.

As shown in FIG. 3, the video format processing unit 203 includes: a video input unit 301, a video controlling unit 302, and a video output unit 304. The video input unit 301 takes the 3D video from the input video capturing unit 202. According to the command of the controlling unit 208 in FIG. 2, a video separator 3010 separates video data for the left and right eyes into an odd-numbered-pixel image and an even-numbered-pixel image or into a first-half-column-pixel image and a last-half-column-pixel image. These video are temporarily stored in an odd-numbered-pixel data buffer 3011 and an even-numbered-pixel data buffer 3012. Both sets of data are then sent to the video controlling unit 302.

According to the command of the controlling unit 208 in FIG. 2, the video controlling unit 302 uses a conversion formula to store the 3D video format in DDRII 303. The corresponding conversion formula is used to convert the 3D video format into the 3D checkboard format, field-sequential format, line interlaced format, left-/right-eye single output format, or left-eye/right-eye dual output format. The result is output to the video output unit 304.

According to the command of the controlling unit 208 in FIG. 2, the video output unit 304 stores the video converted and output by the video controlling unit 302 and separated into two sets of images (an odd-numbered-pixel image and an even-numbered-pixel image or into a first-half-column-pixel image and a last-half-column-pixel image) in the odd-numbered-pixel data buffer 3011 and an even-numbered-pixel data buffer 3012). A video combiner 3043 combines them into a video in the 3D checkboard, field-sequential, line interlaced, left-/right-eye single output, or left-eye/right-eye dual output format. The video is then output by the video output multiplexer 205.

Figure 4:
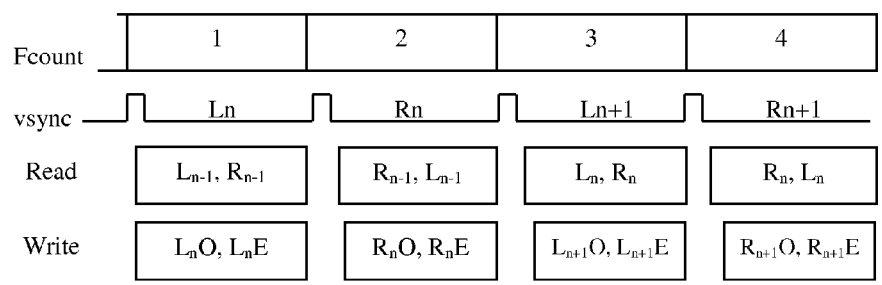
FIG. 4 shows the algorithm of the disclosed 3D video conversion.
Figure 5:
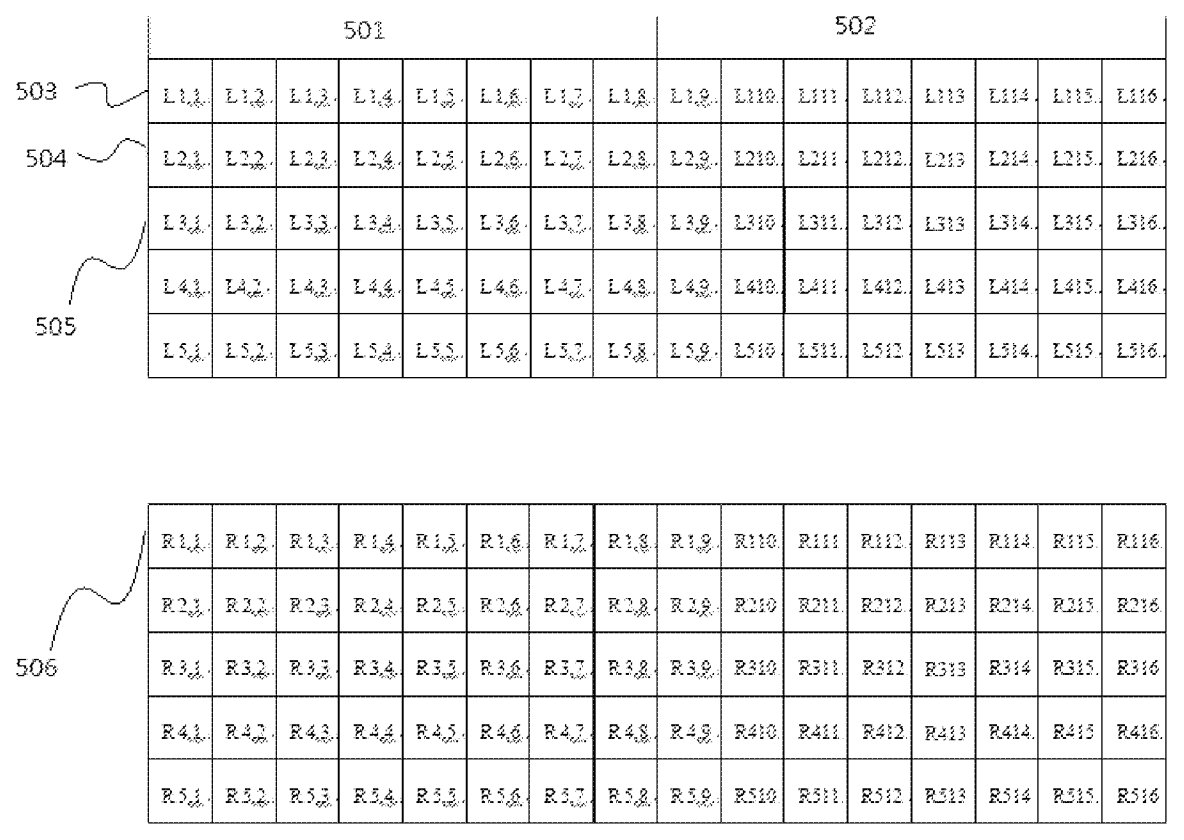

The algorithm used by the video controlling unit 302 to convert the 3D video format into the checkboard, field-sequential, line interlaced, left-/right-eye single output, or left-eye/right-eye dual output format consists of four working sequences, as shown in FIG. 4. The data are divided in different ways into first-half-column data 501 and last-half-column data 502, odd-numbered-row data 503 and even-numbered-row data 504, or left image 505 and right image 506, as shown in FIG. 5.

Figure 6:
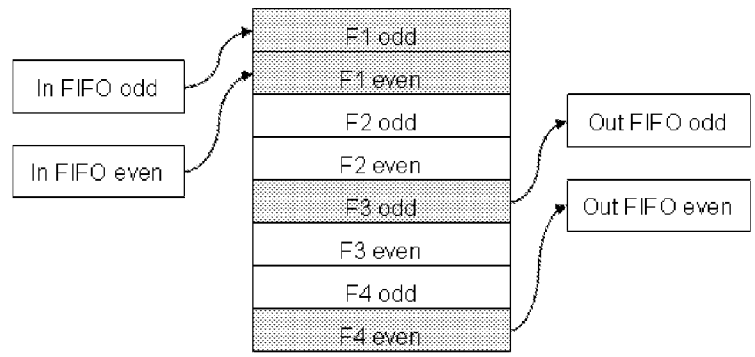
FIG. 6-9 show the status of memory for the odd-numbered-row and even-numbered-row data of frames 1-4 when they are converted into the checkboard format.
Figure 6:
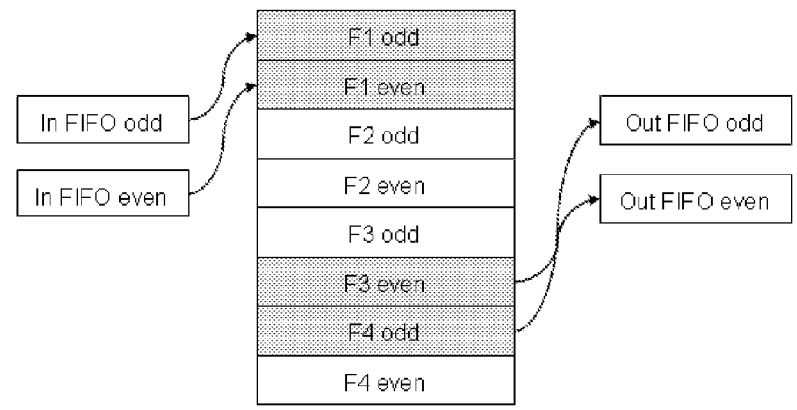

The first sequence Ln processes odd-numbered-row image and even-numbered-row image for the left eye. As shown in FIG. 6, there are four actions in processing the odd-numbered-row image for the left eye. First, odd-numbered pixels in each row of the left-eye image are read out from the data buffer and written into odd-numbered-pixel DDRII in frame 1. Second, even-numbered pixels in each row of the left-eye image are read out from the data buffer and written into even-numbered-pixel DDRII in frame 1. Third, the odd-numbered-pixel data in frame 3 are read out from the DDRII and written to the output odd-numbered-pixel data buffer. Last, the even-numbered-pixel data in frame 4 are read out from the DDRII and written to the output even-numbered-pixel data buffer.

There are also four actions in processing the even-numbered-row image for the left eye. First, odd-numbered pixels in each row of the left-eye image are read out from the data buffer and written into odd-numbered-pixel DDRII in frame 1. Second, even-numbered pixels in each row of the left-eye image are read out from the data buffer and written into even-numbered-pixel DDRII in frame 1. Third, the odd-numbered-pixel data in frame 4 are read out from the DDRII and written to the output odd-numbered-pixel data buffer. Last, the even-numbered-pixel data in frame 3 are read out from the DDRII and written to the output even-numbered-pixel data buffer. This completes the actions in the first sequence Ln.

Figure 7:
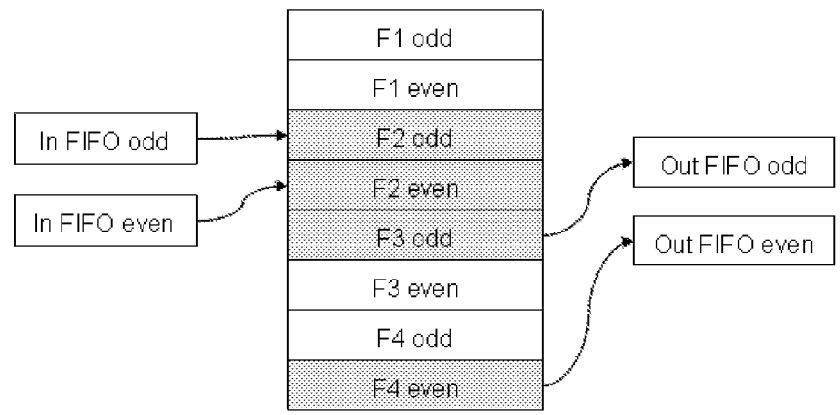
Figure 7:
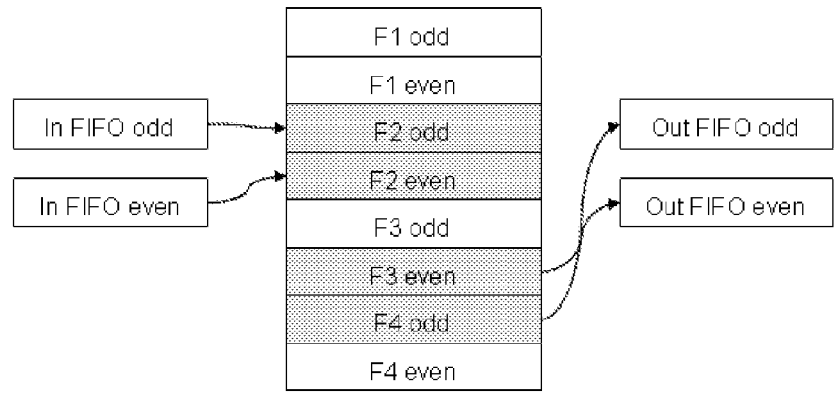

The second sequence Rn processes odd-numbered-row image and even-numbered-row image for the right eye. As shown in FIG. 7, there are four actions in processing the odd-numbered-row image for the right eye. First, odd-numbered pixels in each row of the right-eye image are read out from the data buffer and written into odd-numbered-pixel DDRII in frame 2. Second, even-numbered pixels in each row of the right-eye image are read out from the data buffer and written into even-numbered-pixel DDRII in frame 2. Third, the odd-numbered-pixel data in frame 3 are read out from the DDRII and written to the output odd-numbered-pixel data buffer. Last, the even-numbered-pixel data in frame 4 are read out from the DDRII and written to the output even-numbered-pixel data buffer.

There are also four actions in processing the even-numbered-row image for the right eye. First, odd-numbered pixels in each row of the right-eye image are read out from the data buffer and written into odd-numbered-pixel DDRII in frame 2. Second, even-numbered pixels in each row of the right-eye image are read out from the data buffer and written into even-numbered-pixel DDRII in frame 2. Third, the odd-numbered-pixel data in frame 4 are read out from the DDRII and written to the output odd-numbered-pixel data buffer. Last, the even-numbered-pixel data in frame 3 are read out from the DDRII and written to the output even-numbered-pixel data buffer. This completes the actions in the second sequence Rn.

Figure 8:
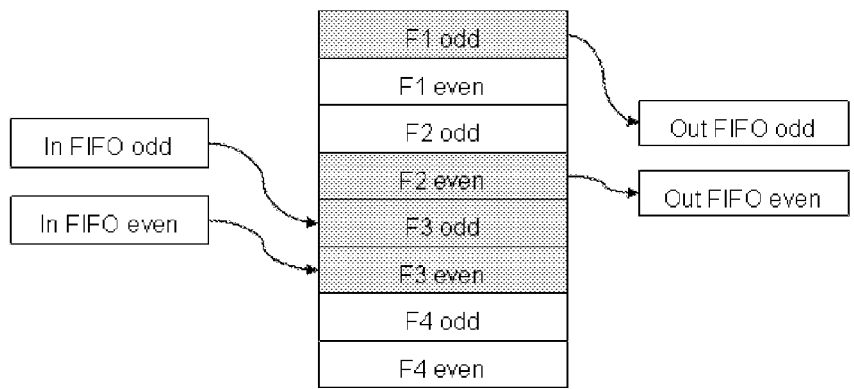
Figure 8:
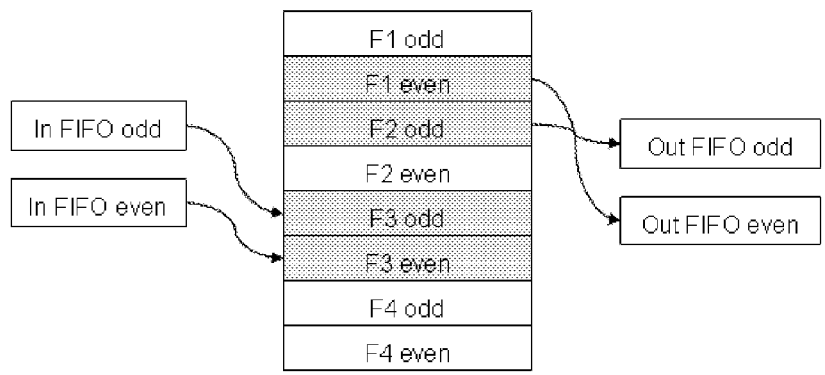

The third sequence Ln+1 processes odd-numbered-row image and even-numbered-row image for the left eye. As shown in FIG. 8, there are four actions in processing the odd-numbered-row image for the left eye. First, odd-numbered pixels in each row of the left-eye image are read out from the data buffer and written into odd-numbered-pixel DDRII in frame 3. Second, even-numbered pixels in each row of the left-eye image are read out from the data buffer and written into even-numbered-pixel DDRII in frame 3. Third, the odd-numbered-pixel data in frame 1 are read out from the DDRII and written to the output odd-numbered-pixel data buffer. Last, the even-numbered-pixel data in frame 2 are read out from the DDRII and written to the output even-numbered-pixel data buffer.

There are also four actions in processing the even-numbered-row image for the left eye. First, odd-numbered pixels in each row of the left-eye image are read out from the data buffer and written into odd-numbered-pixel DDRII in frame 3. Second, even-numbered pixels in each row of the left-eye image are read out from the data buffer and written into even-numbered-pixel DDRII in frame 3. Third, the odd-numbered-pixel data in frame 2 are read out from the DDRII and written to the output odd-numbered-pixel data buffer. Last, the even-numbered-pixel data in frame 1 are read out from the DDRII and written to the output even-numbered-pixel data buffer. This completes the actions in the third sequence Ln+1.

Figure 9:
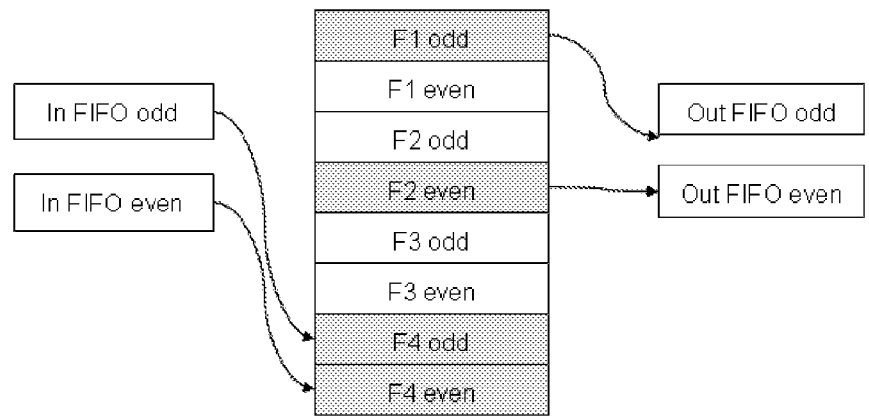
Figure 9:
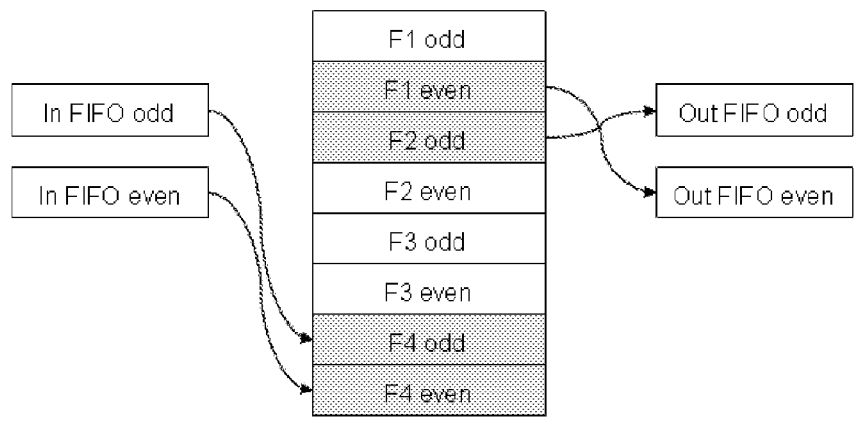
Figure 10:
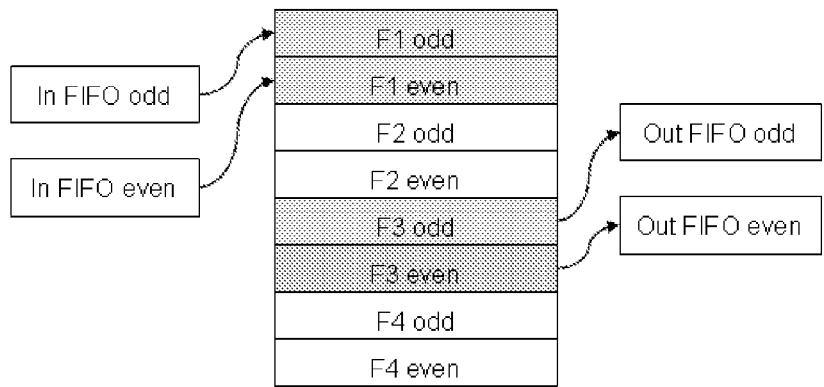
FIG. 10-13 show the status of memory for the odd-numbered-row and even-numbered-row data of frames 1-4 when they are converted into the frame-sequential format.
Figure 10:
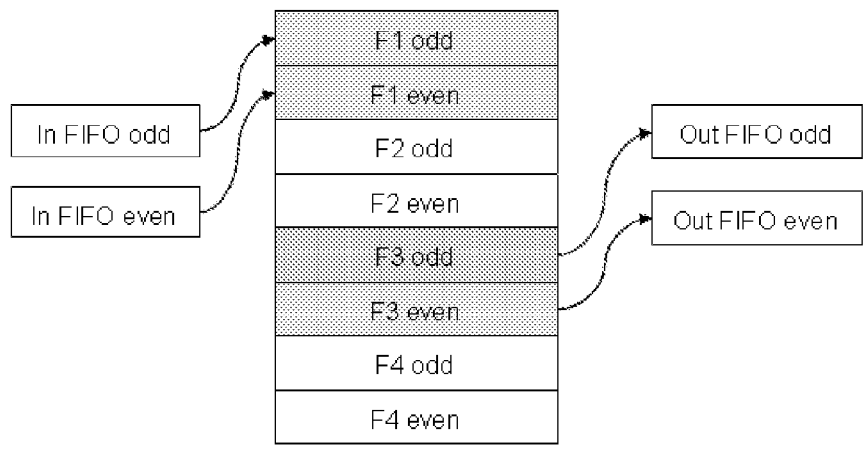
Figure 11:
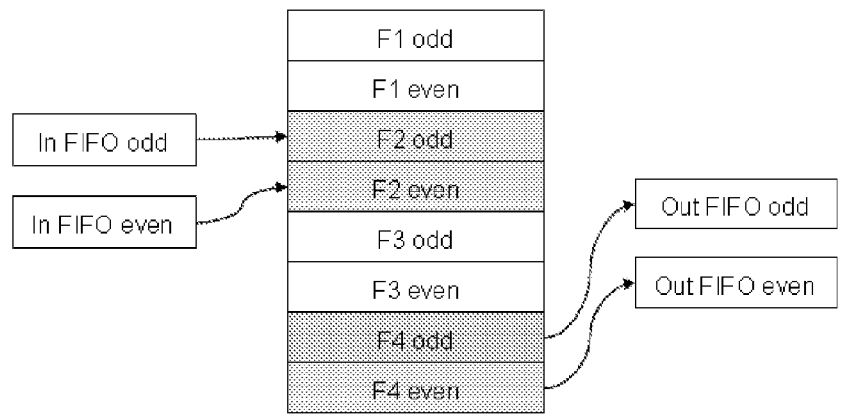
Figure 11:
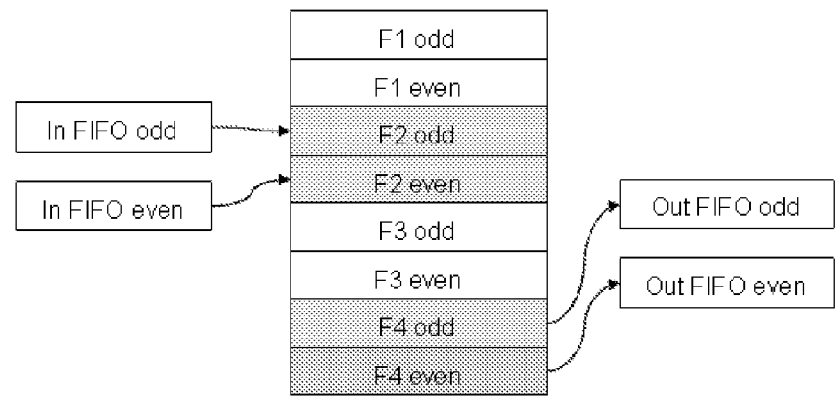
Figure 12:
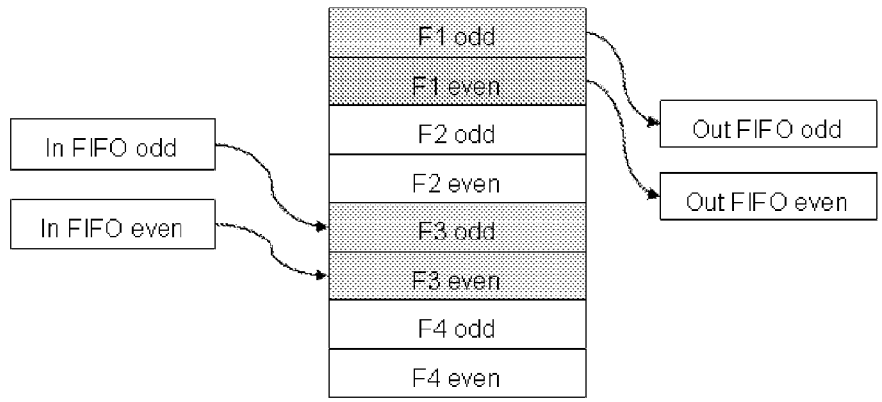
Figure 12:
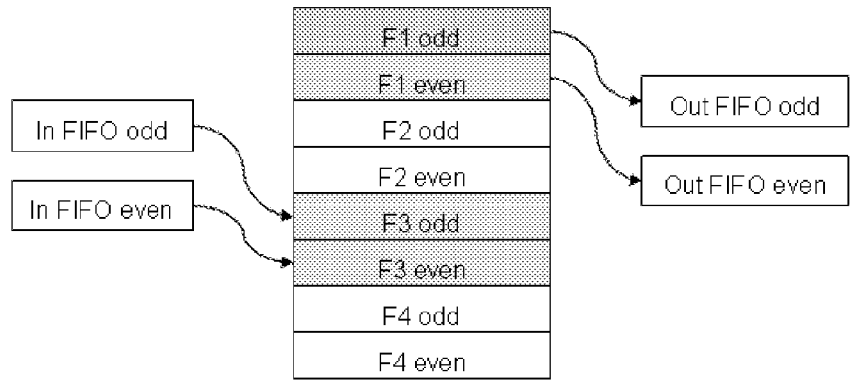
Figure 13:
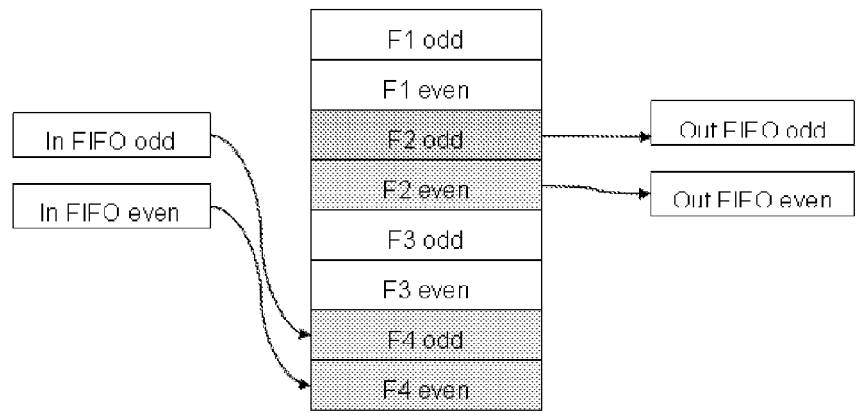
Figure 13:
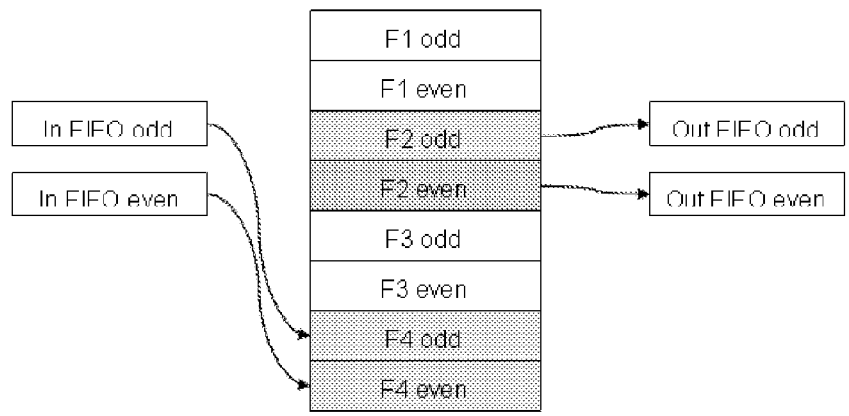
Figure 14:
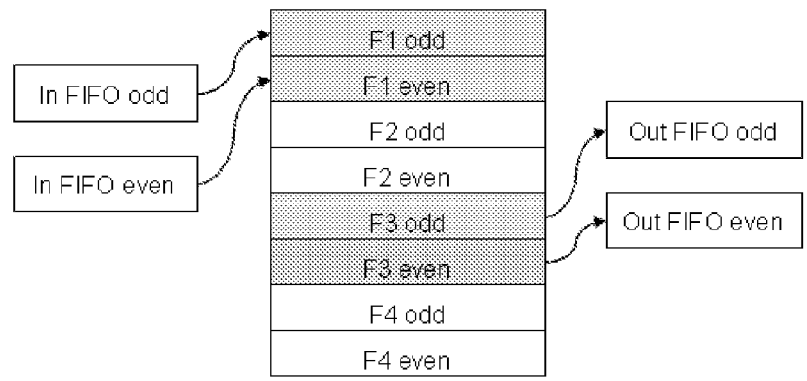
FIGS. 14-17 show the status of memory for the odd-numbered-row and even-numbered-row data of frames 1-4 when they are converted into the line interlaced format.
Figure 14:
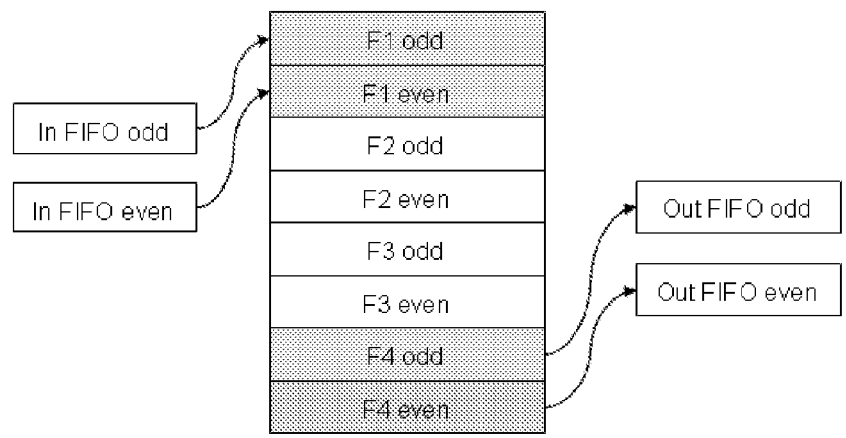
Figure 15:
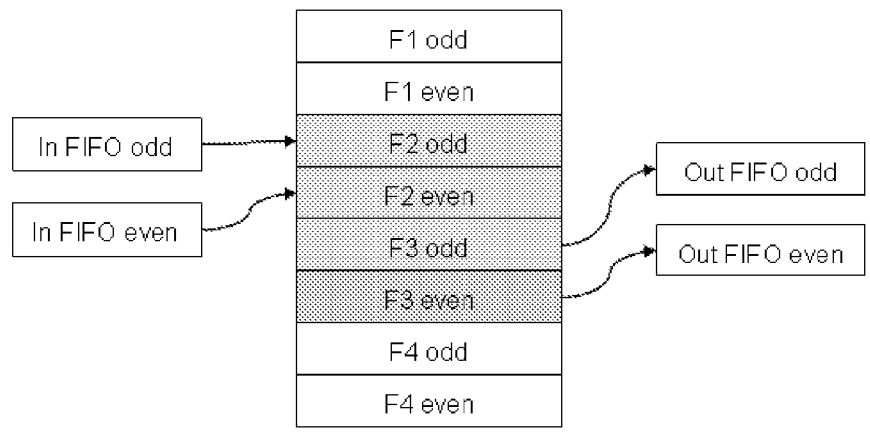
Figure 15:
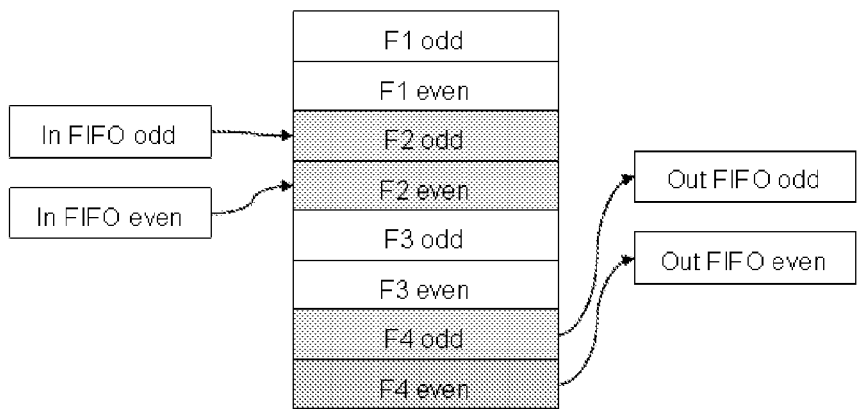
Figure 16:
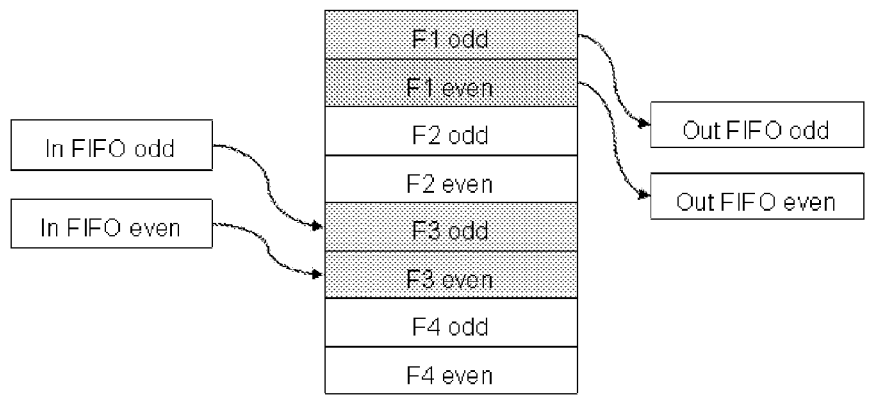
Figure 16:
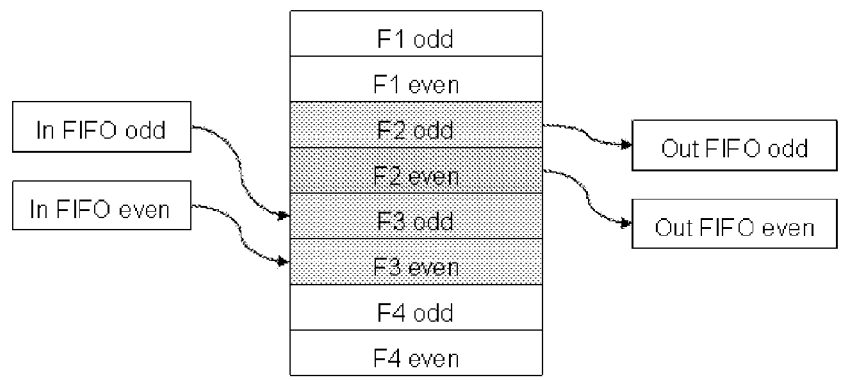
Figure 17:
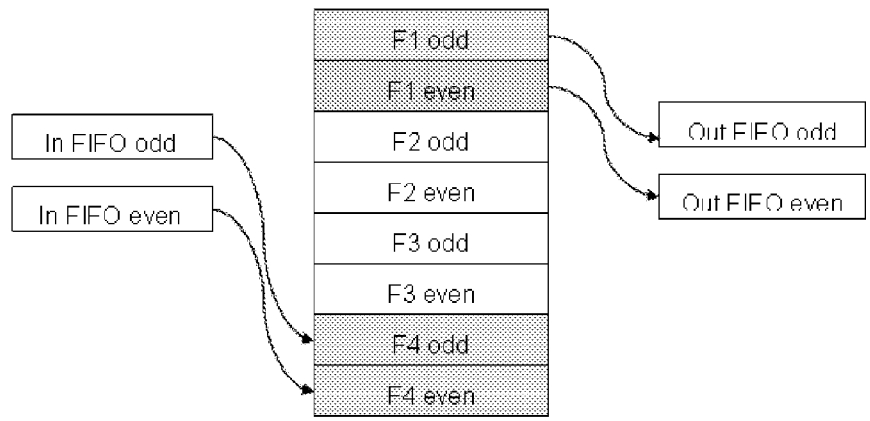
Figure 17:
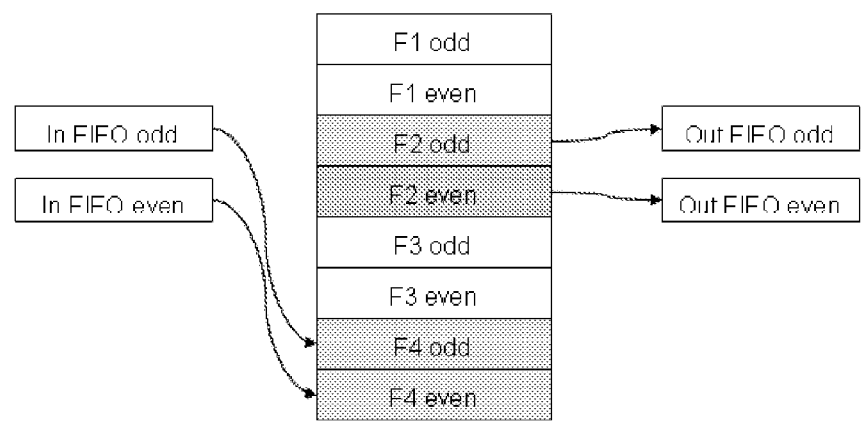
Figure 18:
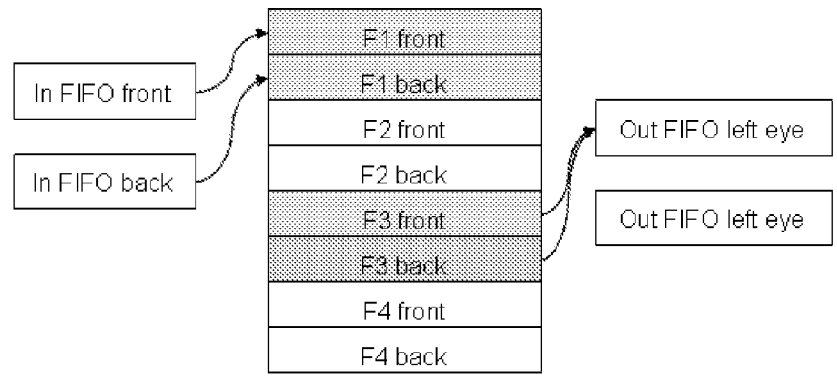
FIGS. 18-21 show the status of memory for the odd-numbered-row and even-numbered-row data of frames 1-4 when they are converted into the left-/right-eye single output format.
Figure 18:
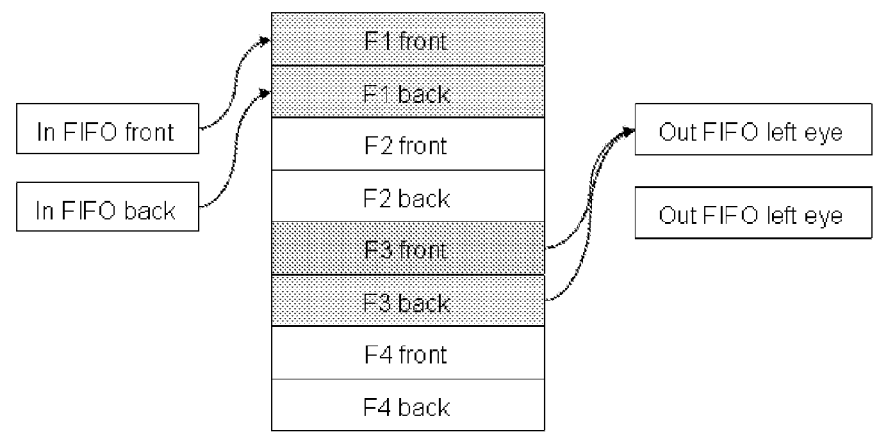
Figure 19:
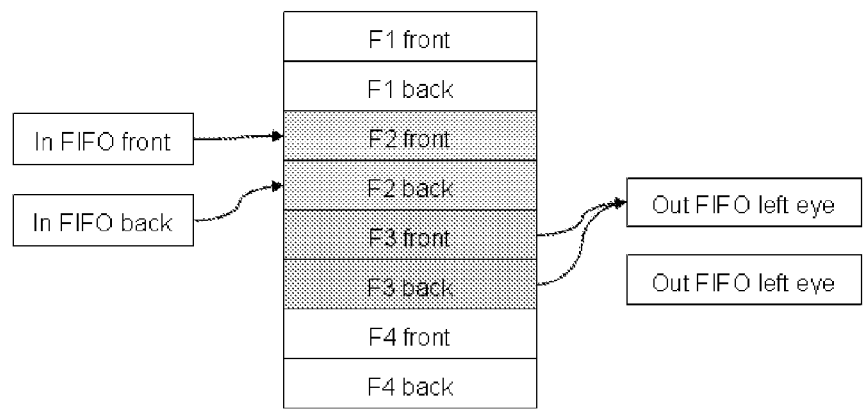
Figure 19:
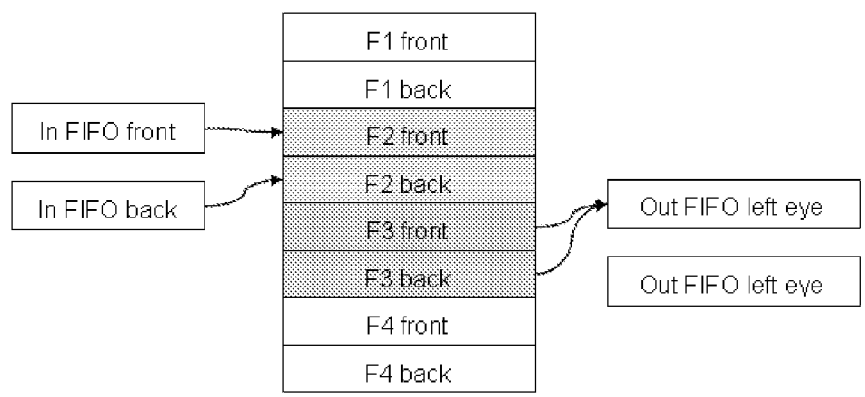
Figure 20:
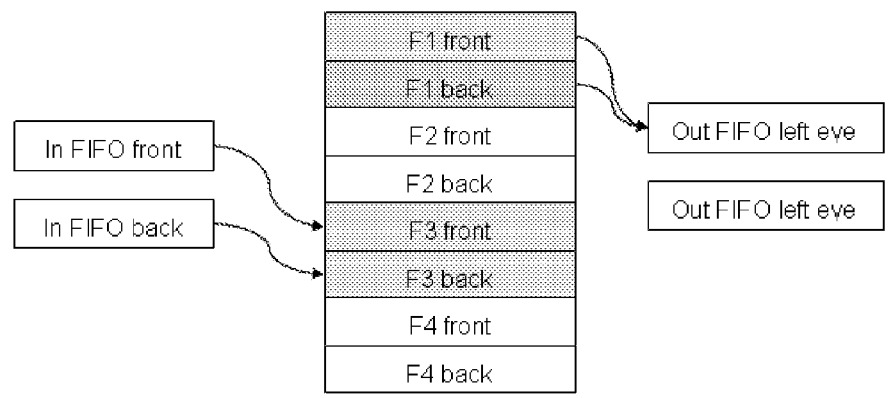
Figure 20:
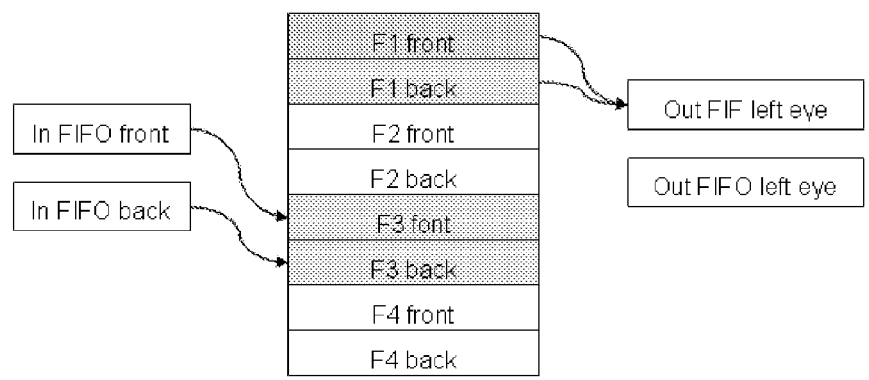
Figure 21:
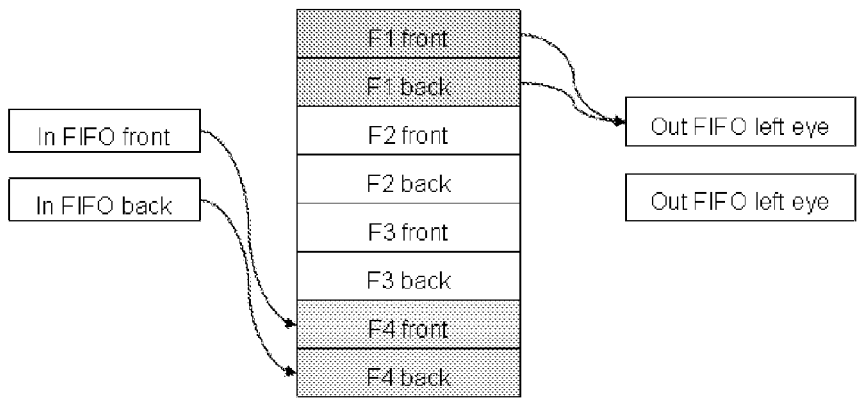
Figure 21:
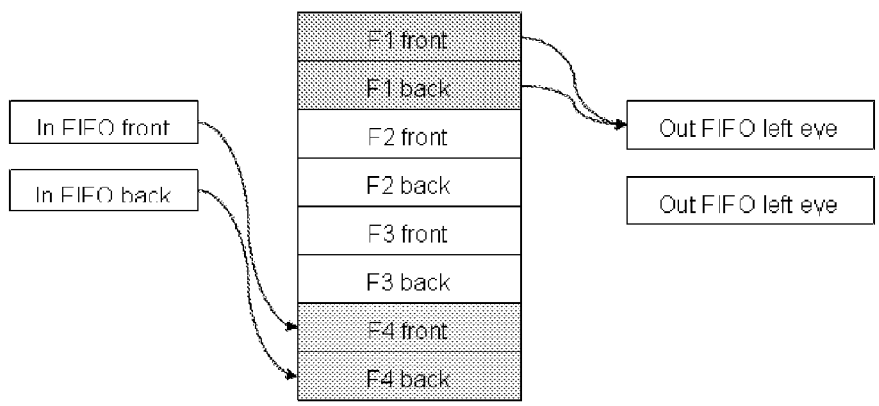
Figure 22:
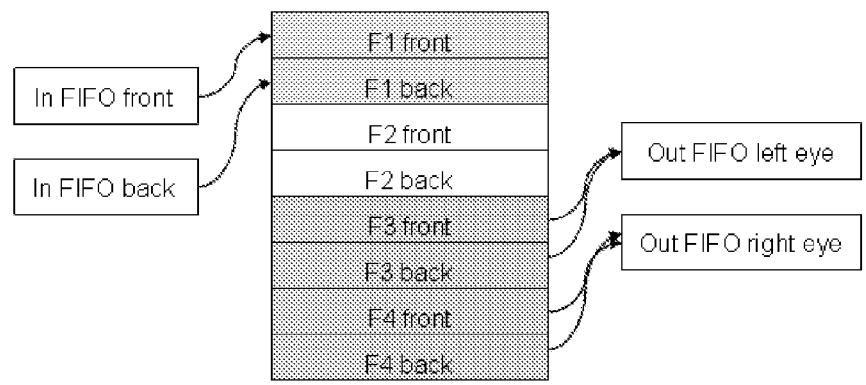
FIGS. 22-25 show the status of memory for the odd-numbered-row and even-numbered-row data of frames 1-4 when they are converted into the left-eye/right-eye dual output format.
Figure 22:
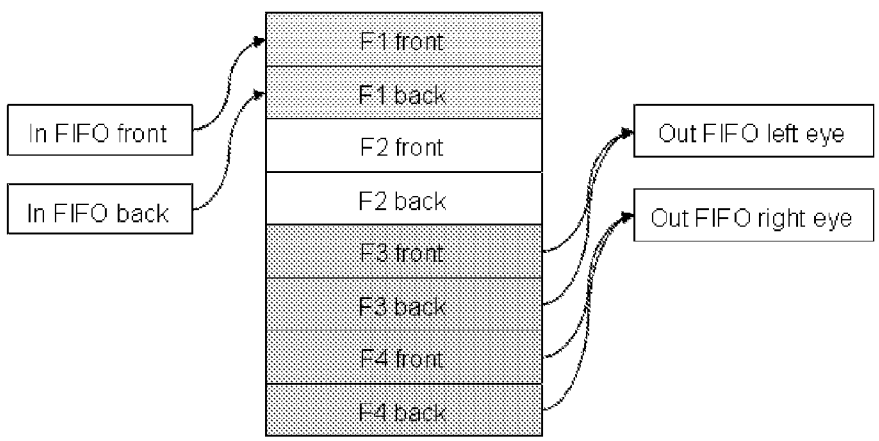
Figure 23:
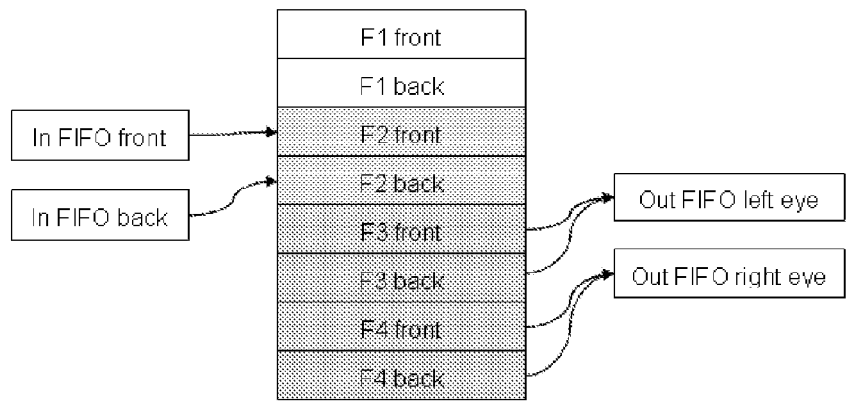
Figure 23:
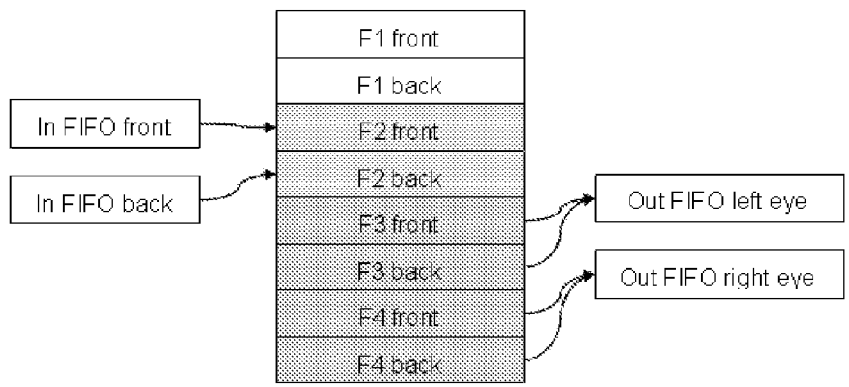
Figure 24:
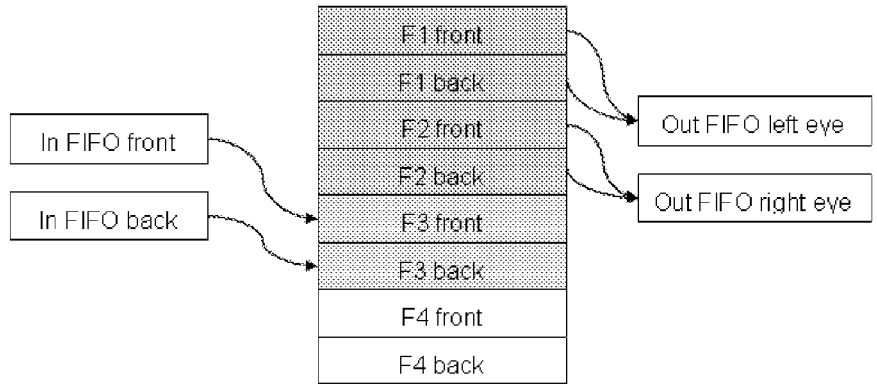
Figure 24:
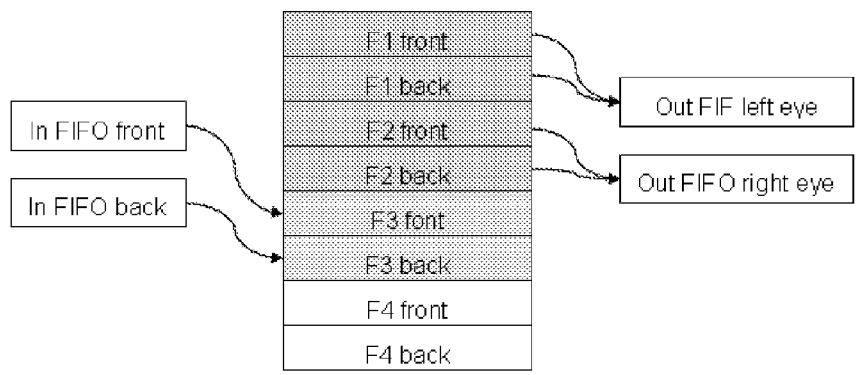
Figure 25:
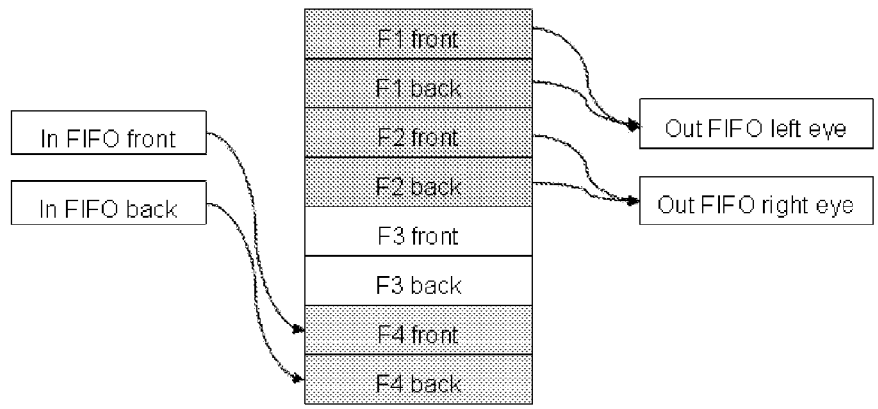
Figure 25:
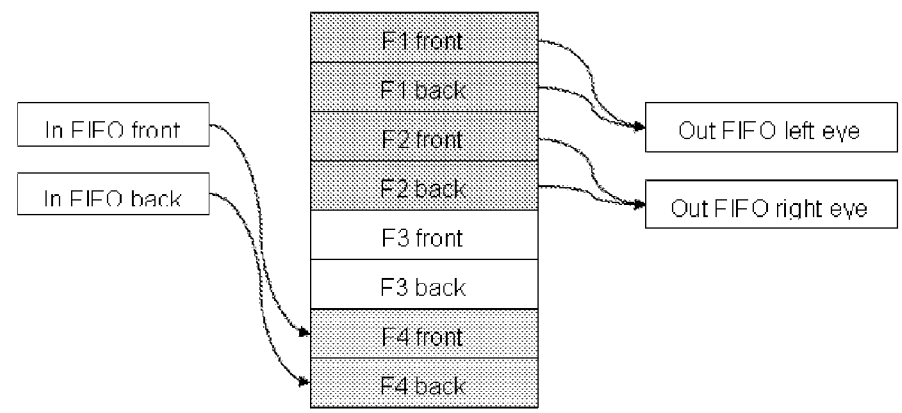

The fourth sequence Rn+1 processes odd-numbered-row image and even-numbered-row image for the right eye. As shown in FIG. 9, there are four actions in processing the odd-numbered-row image for the right eye. First, odd-numbered pixels in each row of the right-eye image are read out from the data buffer and written into odd-numbered-pixel DDRII in frame 4. Second, even-numbered pixels in each row of the right-eye image are read out from the data buffer and written into even-numbered-pixel DDRII in frame 4. Third, the odd-numbered-pixel data in frame 1 are read out from the DDRII and written to the output odd-numbered-pixel data buffer. Last, the even-numbered-pixel data in frame 2 are read out from the DDRII and written to the output even-numbered-pixel data buffer.

There are also four actions in processing the even-numbered-row image for the right eye. First, odd-numbered pixels in each row of the right-eye image are read out from the data buffer and written into odd-numbered-pixel DDRII in frame 4. Second, even-numbered pixels in each row of the right-eye image are read out from the data buffer and written into even-numbered-pixel DDRII in frame 4. Third, the odd-numbered-pixel data in frame 2 are read out from the DDRII and written to the output odd-numbered-pixel data buffer. Last, the even-numbered-pixel data in frame 1 are read out from the DDRII and written to the output even-numbered-pixel data buffer. This completes the actions in the fourth sequence Rn+1.

The FPGA repeats the above-mentioned sequences to convert the video into the checkboard format.

Likewise, the FPGA can repeat the sequences in FIGS. 10-13 to convert the video into the field-sequential format.

Alternatively, the FPGA can repeat the sequences in FIGS. 14-17 to convert the video into the line interlaced format.

Alternatively, the FPGA can repeat the sequences in FIGS. 18-21 to convert the video into the left-/right-eye single output format.

Alternatively, the FPGA can repeat the sequences in FIGS. 22-25 to convert the video into the left-/right-eye dual output format.

The input and output units of the above-mentioned 3D video conversion system use the HDMI 1.4a transmission protocol as the 3D video transmission interface.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A smart 3D HDMI video splitter that takes a video signal from a 3D video input unit, sends the video signal to a field-programmable gate array (FPGA) for conversion, uses a micro-controller to detect a type and decide an output video format, and transmits original 3D video or processed 3D video to a 3D or 2D television, display, or AVR amplifier; with the FPGA including a video input unit, a video format processing unit, a controlling unit, and a multiplexer unit; wherein the video input unit synchronizes and renormalizes the 3D video according to a command from the controlling unit;

the video format processing unit uses a conversion formula to convert the 3D video format into the 3D checkboard format, frame-sequential format, line interlaced format, left-/right-eye single output format, or left-eye/right-eye dual output format, using second-generation double-speed dynamic random access memory (DDRII) as a storage medium, outputs the video to the multiplexer unit, and converts the video into the format determined by the controlling unit;

the controlling unit sends command which divides the video signal into odd-numbered-pixel image and even-numbered-pixel image and outputs a video format command to the video format processing unit when the output image is in the checkboard, frame-sequential or line interlaced format; the controlling unit sends command which divides the video signal into first-half-column-pixel image and last-half-column-pixel image and outputs a video format command to the video format processing unit when the output video is in the left-/right-eye single output format or left-eye/right-eye dual output format; and the final output video is output by the multiplexer unit is either the original 3D video format or the processed video format according to whether the micro-controller detects the connected device as a 3D or 2D television, display, or AVR amplifier.

2. The smart 3D HDMI video splitter of claim 1, wherein the micro-controller directly uses the detected type of the television, display, or AVR amplifier to control the FPGA to select the output video format.

3. The smart 3D HDMI video splitter of claim 1, wherein the selection of the video conversion format of the FPGA is controlled by the micro-controller.

* * * * *